UNITED STATES PATENT OFFICE 2,611,737

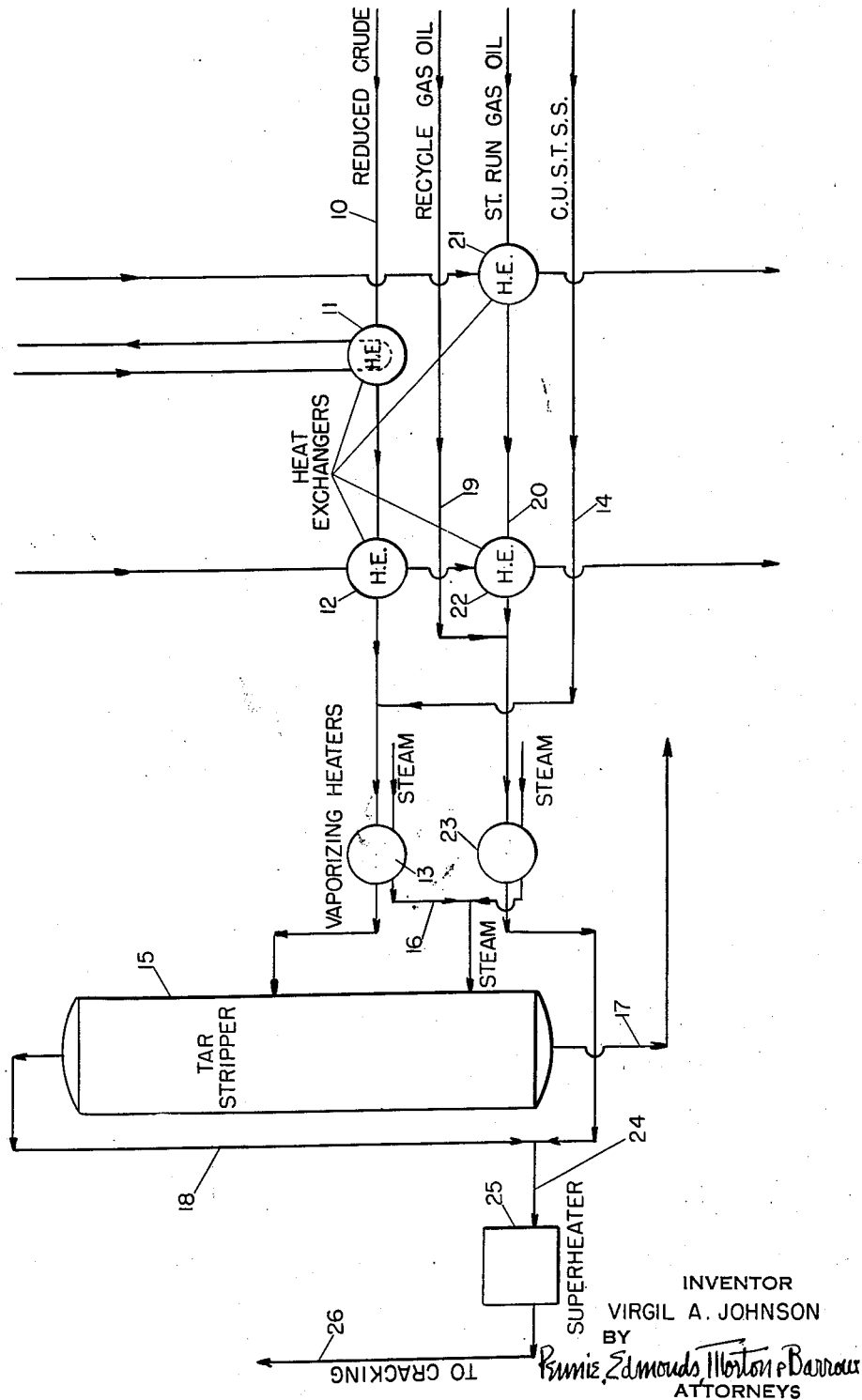

PROCESS FOR THE PREPARATION OF HYDROCARBON CRACKING STOCK FOR CATALYTIC CRACKING

Virgil A. Johnson, Homewood, Ill., assignor to Sinclair Refining Company, New York, N. Y., a corporation of Maine Application February 9, 1949, Serial No. 75,356

1 Claim. (Cl. 196—52)

My invention relates to improvements in the continuous preparation of catalytic cracking charge stock from distillate and residual stocks normally available in refineries. More especially, it resides in continuously providing feed stock to catalytic cracking at optimum reactor temperatures by separately preheating distillate and residual stocks, flashing the residual stock, and thereupon combining the flashed vapors with the preheated distillate stock and superheating the combined stream to higher reactor temperatures than are possible with conventional handling.

My invention is designed to facilitate and improve the methods of continuously preparing charge stock to catalytic cracking units under conditions obtaining in most petroleum refineries. Nearly all refineries derive cracking stocks from a variety of sources; e. g., virgin or straight run gas oils, recycle gas oils, reduced crude, and the like, and the heterogeneity of available stocks is characteristically subjected to the same pretreatment to clean up, preheat, and vaporize them prior to charging to the various catalytic cracking processes. Of course, it is essential to clean up catalytic cracking charge stocks because regenerating capacity may be a prime limiting factor as in the fluid cracking process, or because operating efficiency and timing cycles or good product distribution require clean charging stocks.

Although refiners are severely pressed to obtain suitable feed stocks in sufficient quantity, capacity is limited by the desirability of avoiding premature cracking before contacting the feed with the catalyst in the cracking reactor system. In this respect, the time the stock is subjected to cracking temperatures is the dominant factor. When distillate stocks are heated to higher temperatures, they vaporize and have a high velocity through the heater so that the time factor and correlatively the severity of crack are reduced. The time factor, however, is higher with residual stocks due to the difficulty of vaporizing them at operating pressures. Residual stocks, therefore, are subjected to a more severe crack than lighter stocks under similar temperature conditions because of the increased time factor, with resulting coke formation causing interruption in heater operation.

Charge stock capacity is further limited by the practical necessity of cleaning up catalytic cracking charging stocks by removal of tarry and asphaltic matter so as to avoid excessive coke lay-down in the reactor. Yet, it is customary in catalytic cracking charging stock preparation to run all stocks, regardless of nature or source, in admixture through the feed preparation system. I have found that this limits reactor temperatures by restricting feed temperatures to those produced by superheating for a short time period vapors off the tar strippers or flash towers used in charge stock preparation. Since flash temperatures of combined streams containing residual stocks are limited to about 800° to 850° F. to avoid excessive cracking, the temperature pickup by superheating prior to introduction to the reactor is limited to approximately another 100° to 150° F., or an increase to 950° to 1000° F. This limitation on reactor feed temperature is becoming more and more restrictive as special catalysts permitting and making higher reactor temperatures economically desirable have attained importance. I have discovered, however, that increased capacity of the stripping or clean up section and higher reactor temperatures can be simultaneously obtained by a relatively simple but strikingly beneficial procedure. Thus, I separately preheat distillate and residual stocks, separately flashing the residual stock to knock out tar and asphaltic matter, and then combine the flashed vapors with the preheated distillate stock for delivery to cracking, usually after superheating the combined stream to the highest possible reactor temperature. In so doing, I take advantage of the fact that the usual blend of distillate charge stocks; e. g., virgin gas oil, recycle gas oil, and/or heavy naphtha may be preheated to appreciably higher temperatures without cracking than the residual and heavier stocks which must be cleaned up before charging to the catalytic cracking unit. Thus, for example, I heat the distillate charge stream to a temperature upwards of about 1050° F., while the flash temperature of the residual stream is held at about 800° to 825° F. The preheated residual stream is ordinarily flashed, say at a pressure of about 25 p. s. i. g., and steam may be added to improve vaporization. When the flashed vapors are combined with the preheated distillate stream, full advantage is taken of the higher sensible heat in the distillate stream, so that the combined vapor stream can be quickly superheated to the higher reactor temperatures; e. g., upwards of about 1050° to 1150° F., without undue cracking in view of the reduction in the time factor.

My improved method will be illustrated in the accompanying drawing which provides by way of example one practical flow plan. The residual stock; e. g., a reduced crude is charged through line 10, picks up heat by heat exchange from circulating hot streams from other units in heat exchangers 11 and 12 and is then passed through vaporizing heater 13 of the Deflorez type. As shown, a heavy side stream from a combination unit secondary tower may be added to the reduced crude charge through line 14 before heater 13. The preheated residual stream is then flashed in tar stripper 15 under conditions of mild pressure although obviously pressure may be varied in this operation according to the stock handled and the desired overhead. Steam is usually admitted to the tower as through line 16 to take advantage of the partial pressure effect in obtaining increased vaporization at lower temperatures. The bottoms are withdrawn through line 17, while the flashed vapors pass overhead through line 18.

The distillate charge stream is usually made up of several light stocks as, for example, recycle gas oil charged through line 19 and straight run or virgin gas oil charged through line 20. As shown the recycle gas oil is pumped hot from the cracking units while the straight run gas oil is preheated by heat exchange with circulating hot streams from other units in heat exchangers 21 and 22. The combined distillate stream is passed through vaporizing heater 23 of the Deflorez type, and is combined with the flash vapors in line 24. The combined vapor stream is then superheated in superheater 25, and the superheated stream is directly conducted to the catalytic cracking system through line 26.

The improved method will be further illustrated in the following examples comparing it with conventional operation. In a system preparing about 15,000 barrels per day feed for a Thermofor or moving bed type catalytic cracking unit, the feed consisted of reduced crude, a side stream from a combination unit secondary tower, recycle gas oil, and straight run gas oil and heavy naphthas from various refinery sources. Feed was preheated in a series of heat exchangers and then passed through two Deflorez heaters in parallel. The heater effluent was flashed in the tar stripper at 820° F. and 25 p. s. i. g. The gas oil was taken off overhead, and the vapor stream conducted to the superheater. At the superheater entrance process steam was combined with the tar stripper overhead, and the combined stream was heated to about 985° F. in the superheater before passage to the reactor for cracking. The flow rates to the tar stripper are tabulated below:

| Stream | Feed, Bbls./day | Bottoms, Bbls./day | Gas Oil Overhead To Cracking |
|---|---|---|---|
| Reduced Crude | 8,400 | 5,130 | 3,270 |
| #1 C. U. S. T. S. S | 2,020 | | 2,020 |
| #2 C. U. S. T. S. S | 2,040 | | 2,040 |
| Gas Oil | 2,080 | | 2,080 |
| Thermal Dehexanizer Bottoms | 1,020 | | 1,020 |
| Straight Run Naphtha | 690 | | 690 |
| Recycle Oil | 3,740 | | 3,740 |
| Total | 19,990 | 5,130 | 14,860 |

When the above unit was modified to utilize my improved method, the reduced crude was preheated in a series of heat exchangers and combined with the side stream from the combination unit secondary tower. The combined stream was then fed to one of the vaporizing heaters and the heater effluent was flashed in the tar stripper at 805° F. with about 5400 lbs./hour of process steam. The steam was introduced into the system at the tar stripper rather than at the superheater inlet in order to obtain lower flash temperatures in the tar stripper. The straight run gas oil was preheated by heat exchange and combined with the recycle gas oil. The combined stream was superheated to about 1085° F. in the second vaporizing heater. This gas oil stream was then combined with the tar stripper stream at the superheater inlet and heated to 1095° F. in the superheater. The superheater effluent was passed to the reactor for cracking. The flow rates to the tar stripper and by passing the tar stripper are tabulated below. It will be noted that the same amount of charge was prepared for cracking, but a significantly higher reactor feed temperature was obtained which resulted in greater severity of cracking and better conversion in the Thermofor unit.

*Flow to tar stripper*

| Stream | Feed, Bbls./day | Bottoms, Bbls./day | Gas Oil Overhead To Cracking |
|---|---|---|---|
| Reduced Crude | 8,400 | 5,130 | 3,270 |
| #1 C. U. S. T. S. S | 2,020 | | 2,020 |
| #2 C. U. S. T. S. S | 2,040 | | 2,040 |
| Total | 12,460 | 5,130 | 7,330 |

*Flow by passing tar stripper*

| Stream | Bbls./day, Gas Oil to Cracking |
|---|---|
| Gas Oil | 2,080 |
| Thermal Dehexanizer Bottoms | 1,020 |
| Straight Run Naphtha | 690 |
| Recycle Oil | 3,740 |
| Total | 7,530 |

Total gas oil to cracking = 7530 + 7330 = 14,860 bbls./day.

By modifying the above described method by utilizing a higher flash temperature; i. e., 825° F., in the tar stripper, I have found that both a higher reactor feed temperature; i. e., 1110° F., and increased gas oil charge; i. e., 580 bbls./day, for reactor feed are obtained. The following flow rates and temperatures illustrate one example of this higher temperature method.

*Flow to tar stripper*

| Stream | Feed, Bbls./day | Bottoms, Bbls./day | Gas Oil Overhead To Cracking |
|---|---|---|---|
| Reduced Crude | 8,400 | 4,550 | 3,850 |
| #1 C. U. S. T. S. S | 2,020 | | 2,020 |
| #2 C. U. S. T. S. S | 2,040 | | 2,040 |
| Total | 12,460 | 4,550 | 7,910 |

*Flow by passing tar stripper*

| Stream | Bbls./day, Gas Oil to Cracking |
|---|---|
| Gas Oil | 2,080 |
| Thermal Dehexanizer Bottoms | 1,020 |
| Straight Run Naphtha | 690 |
| Recycle Oil | 3,740 |
| Total | 7,530 |

Total gas oil to cracking = 7530 + 7910 = 15,440 bbls./day.

Temperatures:
  Tar Stripper Flash = 825° F.
  Reactor Feed = 1110° F.

Hence my improved method of preparing catalytic cracking charge stocks provides an operation which can be used for any type catalytic cracking system when the cracking feed stock is obtained from various refinery sources and a tar stripper is used to prepare feed continuously for cracking purposes. My improved system obviates overloading of the tar stripper and yields a cleaner stock to cracking, while simultaneously producing higher reactor feed temperatures, e. g. 1095° F. compared to about 985° F. maximum in conventional operation, allowing added cracking severity which can be profitably utilized with present catalysts. Moreover, in certain operations, the amount of gas oil feed available for cracking from present cracking stocks can be significantly increased while developing the higher reactor feed temperatures.

I claim:

In the continuous preparation of catalytic charge stock from residual stock having components which tend to crack and form coke upon heating to a high temperature and from distillate stock, the improvement which consists of separately preheating the residual stock to a moderate temperature of about 800° F., flashing said preheated residual stock to knock out tar and asphaltic matter and to produce residual stock vapors at a temperature of about 800° F., separately vaporizing said distillate stock by preheating to a higher temperature upwards of about 1050° F., combining the relatively low temperature residual stock vapors with the relatively high temperature distillate stock vapors to elevate the temperature of the residual stock vapors and to lower the temperature of the distillate stock vapors, rapidly passing the combined stream of distillate and residual stock vapors through a superheating zone to raise quickly the temperature of the combined stream to upwards of about 1080° F. thereby avoiding undue cracking and coking of the residual stock vapors, and conducting the superheated vapor stream to the catalytic cracking reaction system.

VIRGIL A. JOHNSON.

REFERENCES CITED

The following references are of record in the file of this patent:

UNITED STATES PATENTS

| Number | Name | Date |
|---|---|---|
| 2,166,176 | Peterkin | July 18, 1939 |
| 2,360,349 | Kassel | Oct. 17, 1944 |